Patented Oct. 20, 1936

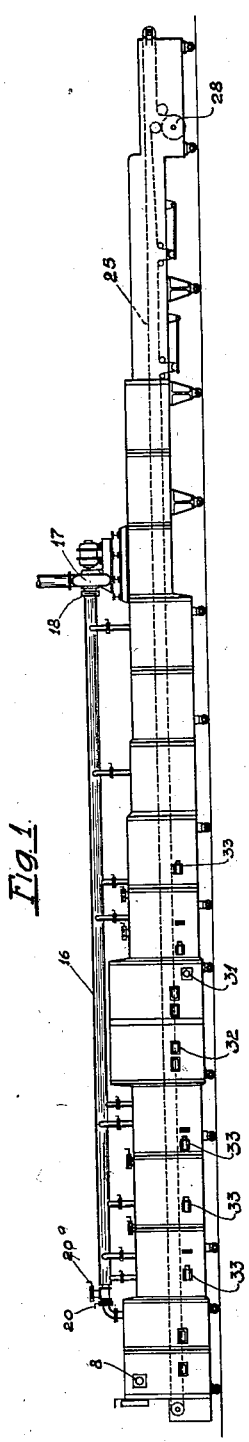

2,058,171

UNITED STATES PATENT OFFICE 2,058,171

COMBINATION ANNEALING AND DECORATING LEER

William A. Morton, Pittsburgh, Pa., assignor to Amco, Incorporated, Pittsburgh, Pa., a corporation of Pennsylvania Application February 14, 1934, Serial No. 711,165

10 Claims. (Cl. 49—47)

This invention relates to new and useful improvements in leers for heat treating glassware, pottery and the like, and it is among the objects thereof to provide a leer structure which shall be adapted to both the annealing of glassware and also for use in fusing colors or enamels on ware.

Another object of the invention is the provision of means in a leer structure for heating the leer from a plurality of sources and by separately controllable heating means, or if desired to heat the leer by a single heating source.

Still a further object of the invention is the construction of a leer for enameling or glazing glassware which shall be especially adapted to the firing of the glaze or enamel and for drawing off the deleterious fumes or vapors that discolor the ware.

Another object is to accelerate temperature changes of the tunnel atmosphere at any desired point in the critical annealing range, which is between 750° and 1000° F. in ordinary commercial glasses, along the leer to control the temperature of the atmosphere or heated air and therefore the ware, independent of the temperature of adjacent sections of the tunnel, and independent of the fuel supply.

I provide spaced air admitting means at the base of the tunnel under the glass, and by means of dampers I am able to regulate the movement of air through the zone in which I desire to control the temperature of the ware. I also provide a similar plurality of air admitting and exhaust means at the top of the glass. The principal object is to rapidly cool the outer surface of the glass article at desired rates to place the outer of the internal forces in the article in compression and thereby increase the strength and resistance to external shocks in service. The rearrangement of these forces is proved optically, and by practical test it is shown that by such controlled cooling in which the outer portion of the glass article is given desired characteristics, the article is improved for commercial service. The ordinary method of regulating the temperature by indirect cooling in a muffle is inadequate for this specific purpose of toughening glass.

None of the prior art leers provide a suitable means for accomplishing this improvement in glass making, which requires an accelerated cooling of the outer surface of the article at a rate in excess of the normal conductivity of the glass, and in excess of the normal rate of cooling brought about by passing the glass in a relatively still atmosphere of air indirectly heated by a muffle to maintain a normal exchange of heat between the furnace and the ware. It is obvious that this method may be employed in the manufacture of plate, sheet, bottle or other glass by substitution of the proper conveying mechanism in the leer.

Ordinarily, glass has no grain or decided molecular arrangement unless undesirable sudden chilling of one portion of the article has occurred, then the grain or stress is substantially perpendicular to the surface and the article has no strength. Under my proposed method the stresses are controlled to give the article a grain or stress parallel to the surface by uniformly cooling the surface and gives the article more resistance to shock perpendicular to the surface.

These and other objects of the invention will become more apparent from a consideration of the accompanying drawing constituting a part hereof in which like reference characters designate like parts and in which:

Figure 1 is a side elevational view of a glass annealing and decorating leer embodying the principles of this invention;

Figure 2 a top plan view partially in section of the front portion of the leer; and Figure 3 a longitudinal vertical cross-sectional view of the leer portion shown in Figure 2.

With reference to the several figures of the drawing, the structure therein illustrated comprises a leer tunnel designated by the reference numeral 1 comprising bottom, top and side walls to constitute an elongated heating chamber. The structure is mounted on rollers 2, Figure 3, to render it transportable in a glass plant. At the forward end of the tunnel 1, provision is made for heating through fire boxes or combustion chambers 3 and 4, the chamber 3 being separated from the tunnel by relatively thin tile 5 and chamber 4 is similarly isolated from the interior of the tunnel by tile 6 to constitute the treating tunnel a muffle chamber. The forward end of the combustion chamber 4 is provided with a burner port 7 and burner ports are similarly provided in the side walls of the heating chamber, such a port being shown at 8, Figure 1 of the drawing.

The bottom chamber 4 communicates with a longitudinal flue 9 extending beneath and forming the bottom wall 6 of the leer tunnel 1, the flue at the mid portion of the leer communicating with a fire box or combustion chamber 10, and thence extends forwardly as shown in Figure 3 beyond the chamber 10 towards the front of the leer.

As shown in Figure 3, a fire box or combustion chamber 11 is provided in superposed relation with the fire box 10 at the top of the leer tunnel 1, this chamber being provided with burner ports 12 and separated from the tunnel 1 by thin tile 13.

The longitudinal heating flue 9 is provided at intervals with ports 14 connecting through conduit 15 with an exhaust flue 16, the latter extending a substantial distance on the top of the leer to a blower 17, Figure 1, which through a damper control 18 regulates the withdrawal of the heat from the portions of the flue and heating chambers with which communication is established through the vertical conduits 15 and the connection 19, Figure 3, dampers 20 and 21 being provided to regulate the degree of opening in these passages.

As shown in Figure 3, communication is established between the exhaust flue 16 and the muffle chamber or annealing tunnel 1 through short conduits 22 which are provided with dampers 23, these conduits exhausting the fumes from the heating tunnel, and are used when glaze or enamel is being baked on the ware passing through the tunnel.

The ware is loaded at the front end 24 of the tunnel on an endless conveyor belt 25 which is supported by rollers 26 and 27 in spaced relation with the tile wall 6 constituting the bottom of the tunnel 1.

As is usual in leers of this type, the conveyor belt 25 is maintained under suitable tension to support the ware loaded thereon by an adjustable tension means and drive mechanism generally designated at 28.

One of the features of the structure shown are the communicating passages shown between the top and bottom combustion chambers 4 and 5, these passages being designated by the reference numeral 29, and similar passages being shown at 30 in the fire box 10 to establish communication between the chamber 10 and the upper heating chamber 11. Burner ports 31 are provided at the sides of the bottom combustion chamber 10. The vertical flues 30 carrying the waste gases to the bottom flue are controlled through tiles in openings 32, Figure 1.

Provision is made for admitting air to the annealing tunnel through spaced openings 33 having regulating dampers 34. Also exhaust connections may be provided at the bottom of the tunnel, such as the exhaust passages 37 of the vertical conduits 15 controlled by dampers 38.

Provision is made for admitting air to the annealing tunnel through short conduits at the top of the tunnel spaced between the conduits 22, dampers 36 being provided to regulate the amount of air so admitted.

The operation of the above described leer structure is briefly as follows: The ware to be treated is placed on the conveyor belt 25 at the forward end of the annealing tunnel in any suitable manner as by auxiliary conveying means or the like and the belt 25 is caused to travel through the tunnel at a regulated speed. Heat is supplied by the combustion chambers 3, 4, 10 and 11, and by means of the exhaust ports and conduits 14 and 15 respectively, the heat can be drawn backwards or forward from the fire boxes through flue 9 and heat can be drawn from the front top chamber 3 down the side flues 29 into the longitudinally extending bottom flue 9, thence forwardly along the length of the tunnel or can be withdrawn at intervals through the ports 14.

By operating dampers 20 and 21, the direction and volume of the moving gases can be regulated as desired and the degree of exhaustion of the hot gases through the conduits and the exhaust flue 16 can be further regulated by a damper 20—a at the forward end of the exhaust flue.

By regulating dampers 23 the fumes or gases released in the heating chamber 1 can be withdrawn through the exhaust flue 16 so as to prevent any discoloration of the ware being treated.

One mode of using the leer, as for example if it is employed for annealing the glassware only would consist of shutting off the heating chambers 10 and 11 and heating the leers entirely by heat drawn from the front heating chambers 3 and 4. If a minimum annealing temperature is desired the lower chamber 4 alone may suffice to produce the heating medium which is drawn longitudinally through tunnel 9, for any portion of the length of the flue 9, and if additional heat is required the upper chamber 3 may be fired and the heat drawn downwardly through side flues 29 to the heating flue 9.

When the leer structure is employed for glazing or enameling ware, the central chambers 10 and 11 are also fired and the heat drawn either forwardly or in both directions depending upon the adjustment of the dampers 21 and the rate of exhaustion of the gases through the exhaust conduit 16.

By means of the combined heating chambers at the forward and mid portions of the annealing leer, the maintenance of suitable annealing and glaze firing temperatures are greatly facilitated, and by the additional controllable exhaust means, the proper temperature gradient can be readily established and maintained.

By manipulating dampers 23 of the exhaust members 22 and dampers 34 of inlet passages 33, the movement of air through the zone, in which it is desired to control the temperature of the ware, may be controlled so as to rapidly cool the outer surface of the glass article at desired rates to place the outer of the internal forces in the article in compression and thereby increase the strength and resistance to external shocks in service. The surface treatment of the glass by rapid cooling may be increased by the admission of air through the openings controlled by dampers 36 in the top of the annealing tunnel.

As in other leer structures, the rear end of the annealing tunnel is open for removing the ware from the leer after it has reached room temperature.

I claim:

1. In a leer for heat treating glass, a tunnel constituting a muffle chamber, a conveyor for the glass spaced between the floor and roof of the tunnel to transport the glass therethrough, inlets spaced above the conveyor to admit cold air to the tunnel, dampers for the inlets to regulate the air admitted, outlets spaced above the conveyor to remove heated air from the tunnel and dampers for the outlets to regulate the heated air removed from the tunnel.

2. In a leer for heat treating glass, a tunnel constituting a muffle chamber, a conveyor for the glass spaced between the floor and roof of the tunnel to transport the glass therethrough, spaced inlets above and below the conveyor to admit air to the tunnel, spaced outlets above and below the conveyor to remove heated air from the tunnel, and damper means associated with the said inlets and outlets to selectively control the admission and removal of air along the tunnel.

3. The method of controlling the strength of glass in an annealing and heat treating process which comprises passing the glass through a muffled tunnel, heating a wall of the tunnel by passing a current of heated gases therebeneath, regulating the heating of said wall by varying the quantity of gases flowing in selected portions of the path of travel thereof to retard the cooling of the glass and passing relatively cold air currents uniformly in direct contact with the glass in the critical annealing range to arrange the internal stresses of compression and tension in parallelism with the surface of the glass.

4. A leer for heat treating glassware comprising a tunnel constituting a muffle chamber having a critical heat treatment zone, a flue associated with said tunnel, means for causing heated gases to flow through said flue, spaced air inlets to the tunnel interior adjacent the critical heat treatment zone of the tunnel, means to accelerate the flow of air into the tunnel to cool the glass and means to maintain a relatively normal atmospheric condition in adjacent portions of the tunnel.

5. A leer for treating glassware comprising an annealing tunnel, a conveyor for moving glassware therethrough, regulable heating means at the forward end of said tunnel, additional regulable heating means for maintaining the temperature in the critical heating zone of the tunnel, a temperature regulating heating flue extending longitudinally at the bottom of said tunnel beyond said last named heating means constituting one wall of said tunnel and both of said heating means, and an exhaust flue at the top of said tunnel having a plurality of longitudinally and laterally disposed damper controlled passages communicating with the bottom flue and having damper controlled passages to said annealing tunnel.

6. In a leer for heat treating glass, an annealing tunnel of uniform cross-sectional area throughout its length, an endless conveyor for transporting the ware from end to end through said tunnel, a heating flue coextensive with and located beneath said tunnel, a wall of the flue forming one wall of the tunnel, means for establishing critical heating zones at selected portions longitudinally of the tunnel, and means intermediate and beyond said heat zones for supplying cooling air to the ware passing through the tunnel.

7. In a leer for heat treating glass, an annealing tunnel of uniform cross-sectional area throughout its length, an endless conveyor for transporting the ware from end to end through said tunnel, a heating flue coextensive with and located beneath said tunnel, a wall of the flue forming one wall of the tunnel, longitudinally spaced top and bottom fire boxes, each of the juxtaposed fire boxes having communicating flues and the bottom fire boxes communicating through said bottom heating flues, an exhaust manifold above and exteriorly of the tunnel, having damper controlled exhaust flues communicating with the bottom heating flue and with the bottom of the annealing tunnel, and damper controlled exhaust flues communicating with the interior of the annealing tunnel in the top thereof, the arrangement of fire boxes, heating flues and exhaust flues being such that the ware passing through the tunnel can be subjected to critical annealing temperatures while passing through the critical range of the tunnel, precise temperature conditions being secured and maintained in the direct environment of the exhausting flues.

8. In a leer for heat treating glass, an annealing tunnel of uniform cross-sectional area throughout its length, an endless conveyor for transporting the ware from end to end through said tunnel, a heating flue coextensive with and located beneath said tunnel, a wall of the flue forming one wall of the tunnel, top and bottom fire boxes for heating the tunnel, said fire boxes communicating with the aforementioned heating flue, exhaust means for said heating flue and tunnel and air inlets to the top and bottom of the tunnel, means for regulating the temperatures in the heating flue at intervals longitudinally thereof, and independent means for regulating the temperature of the tunnel by exhausting the heating medium at longitudinal intervals, said exhaust means cooperating with the air inlets to produce a forced circulation of cold air throughout the critical temperature range of the tunnel at the portions of the tunnel where the air inlet and exhaust means are located.

9. In a leer for heat treating glass, an annealing tunnel of uniform cross-sectional area throughout its length, an endless conveyor for transporting the ware from end to end through said tunnel, a heating flue coextensive with and located beneath said tunnel, a wall of the flue forming one wall of the tunnel, top and bottom fire boxes for heating the tunnel, said fire boxes communicating with the aforementioned heating flue, exhaust means for said heating flue and tunnel, air inlets to the tunnel above and below the conveyor, and damper controls for the exhaust outlets and air inlets to obtain forced cooling of the ware at desirable longitudinal intervals of the tunnel.

10. In a leer for heat treating glass, an annealing tunnel of uniform cross-sectional area throughout its length, an endless conveyor for transporting the ware from end to end through said tunnel, a heating flue coextensive with and located beneath said tunnel, a wall of the flue forming one wall of the tunnel, heating means communicating with said flue, regulable means for exhausting the heating medium from the tunnel and flue at longitudinal intervals of the tunnel and flue, and air inlets to the tunnel cooperating with the exhaust means to draw cold air through desired portions of the tunnel while the ware is passing through the critical temperature range of the tunnel.

WILLIAM A. MORTON.